Aug. 6, 1935.  E. L. NALL  2,010,030
LIQUID DISPENSER
Filed Dec. 27, 1933
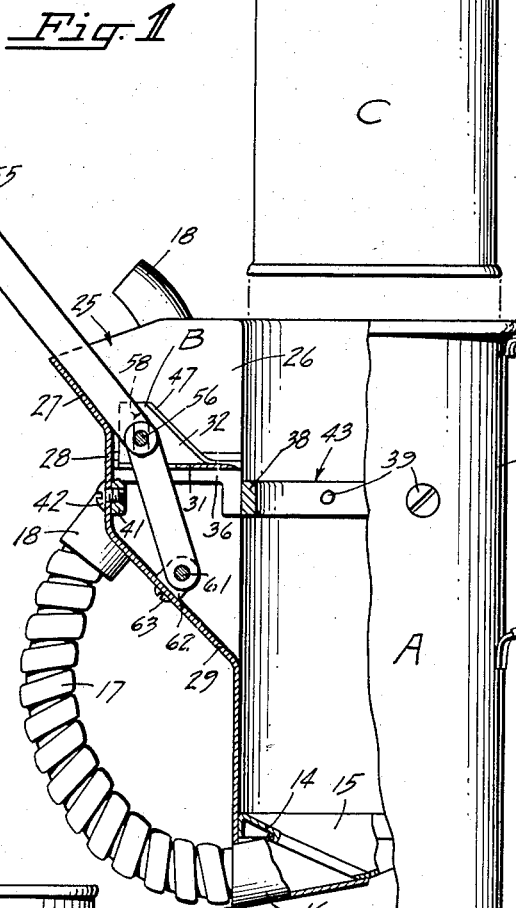
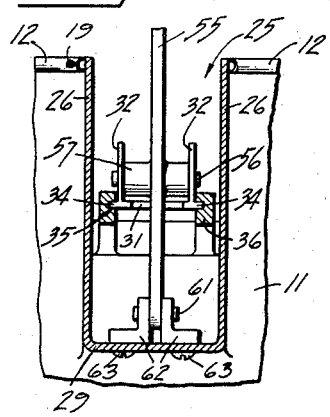
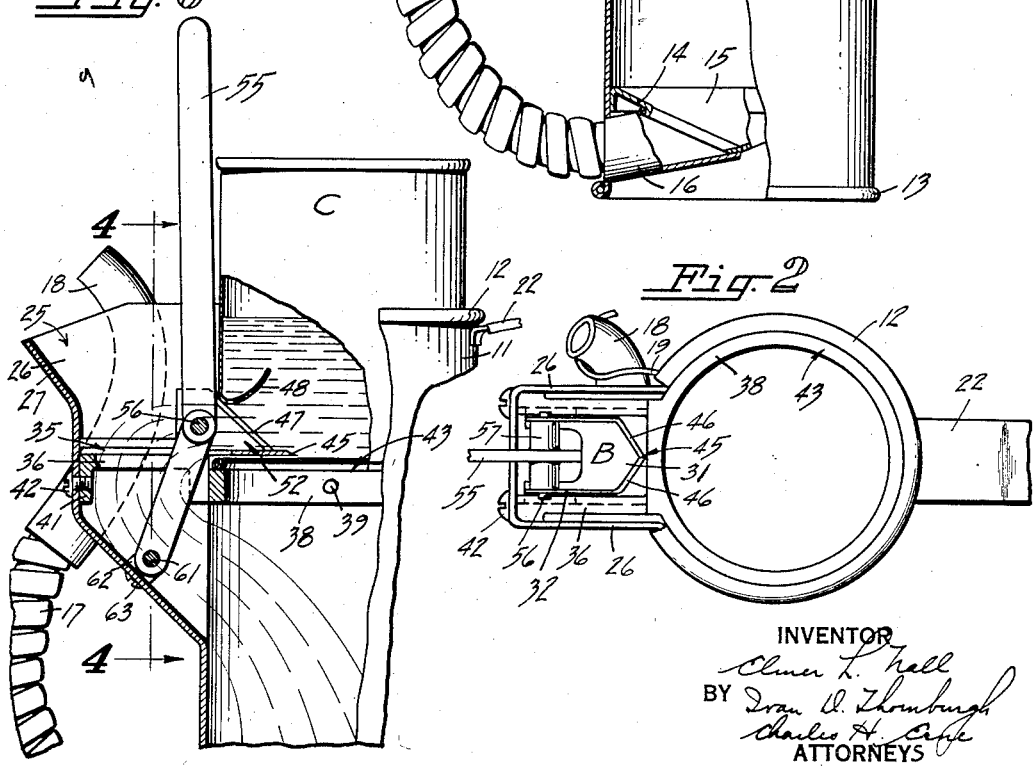
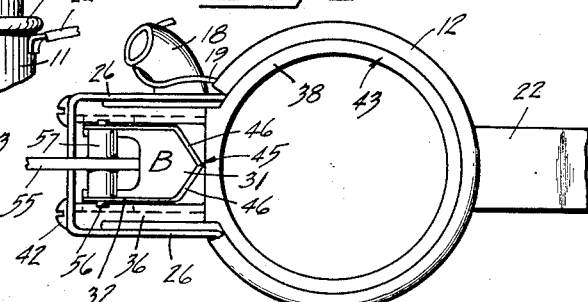
INVENTOR
Elmer L. Nall
BY Ivan D. Thornburgh
Charles H. Cole
ATTORNEYS Patented Aug. 6, 1935

2,010,030

UNITED STATES PATENT OFFICE 2,010,030

LIQUID DISPENSER

Elmer L. Nall, Wheaton, Ill.

Application December 27, 1933, Serial No. 704,192

6 Claims. (Cl. 221—23)

The present invention relates to liquid dispensing devices and has for its object the improvement and simplification of a cutting element for a liquid dispenser which is arranged within the dispenser adjacent one of its side walls and which is adapted to cut into the side wall of and to open a sealed liquid containing receptacle placed within the dispenser so that the liquid contents quickly flow into the dispenser from the receptacle through the cut opening in the wall.

The invention contemplates the use of a cutter of simple construction which not only effects an opening for the discharge of the liquid in the receptacle with a simple single movement but at the same time lays back the metal of the cut wall to produce rapid draining, this cutter being disposed within a pocket formed adjacent to and outside of the side walls of the dispenser, leaving the inside of the dispenser free from obstructions and permitting easy insertion and withdrawal of the receptacle.

A further object of the present invention is the provision of a single cutting element which is slidably held in position adjacent an inside wall of a liquid dispenser and one adapted to cut into a side wall of a liquid containing receptacle when the latter is inserted into the dispenser, the liquid contents of the opened receptacle quickly draining into the dispenser through the cut opening which is made at a low drainage point.

Numerous other objects and advantages of the invention will be apparent as it is better understood from the following description which, taken in connection with the accompanying drawing, discloses a preferred embodiment thereof.

Referring to the drawing:

Figure 1 is a side elevation of a liquid dispenser embodying the present invention, parts being broken away and parts being shown in section, the view also showing a sealed receptacle just above the open end of the dispenser and in position for insertion;

Fig. 2 is a top plan view of the dispenser, partly broken away, shown in Fig. 1;

Fig. 3 is a fragmentary view similar in part to Fig. 1 and showing a sealed receptacle in fully inserted dispensing position and supported within the dispenser; and Fig. 4 is a vertical sectional view taken substantially along the line 4—4 in Fig. 3.

The drawing illustrates a preferred embodiment of the invention as it is adapted to dispensing lubricating oil such as is used in automobiles and in such embodiment there are broadly three main elements, a dispenser A, a cutter B and a sealed oil containing receptacle C.

Part of the dispenser A is similar to dispensers now commonly used in oil and gasoline stations and in garages for dispensing lubricating oil into automobile crank cases and the like, as will be fully pointed out in the description that follows. It comprises a cylindrical body 11 open at the top and having an upper outwardly curled or rolled edge or bead 12 extending around a part of the top rim and a similar lower rolled edge or bead 13.

A bottom 14 is secured within the body 11 and is preferably depressed at 15 to form a conical discharge wall which directs the oil into a discharge pipe 16 connected by means of a flexible hose or tube 17 to a discharge spout 18. When the receptacle is in non-discharging position the spout 18 is adapted to be engaged and supported adjacent the dispenser wall (Figs. 1, 2 and 3) by a hook 19 secured to and extending horizontally from the upper body bead 12. A handle 21 is connected, by an upper strap 22 and a lower strap 23, to the outside wall of the body 11 opposite to the hose 17 and spout 18.

At a position directly opposite the handle 21, the vertical side wall of the body 11 is pressed out as a housing which encloses a pocket 25 for the cutter B. The upper half of the body wall thus extends out in spaced parallel side walls 26 (Figs. 1, 2 and 4) joined together at their front outer edges in an inclined wall 27, a vertical wall 28 and an inclined bottom wall 29 which joins with the body 11. These walls 26, 27, 28, 29 provide a liquid-tight housing for the cutter B and enclose the pocket 25. The pocket communicates directly with the interior of the dispenser body 11 and is also open at the top.

The cutter B in general appearance is like the letter U and has a flat bottom wall 31 bent up on both sides in right angled side walls 32. It has a horizontal sliding movement within the housing. The bottom wall 31 of the cutter projects laterally beyond its vertical side walls 32 as slide sections 34.

These slide sections are loosely mounted for sliding movement in grooves 35 cut in spaced guide bars 36 which are formed integrally with an annular ring member 38 closely fitting within the dispenser body 11 and secured to its side walls by screws 39 or other fastening means. The two guide bars 36 are joined at their outer ends in a depending foot 41 by means of which the bars are held on the housing wall 28, a screw 42 or other fastening means being used for this purpose.

The top edge 43 of the ring 38 is below the bottom wall 31 of the cutter B preferably a distance approximately the height of the bottom seam of the receptacle C. When the receptacle C is inserted in the dispenser A the ring 38 and its edge 43 serve as a support while the receptacle is in the dispenser and locate it in the desired relation to the cutter B so that the latter is just above and to one side of the top edge of the lower seam of the receptacle.

To open the receptacle C the cutter B is moved horizontally and into the side wall of the receptacle and its cutting edge pierces the side wall just above the seam and folds back the adjacent wall parts. The bottom wall 31 of the cutter is provided with a sharp point 45 (Fig. 2) which first engages and pierces the receptacle wall. The cutter bottom wall on both sides of the piercing point extends back at an angle and is also sharpened to provide beveled cutting edges 46.

The front edges of the cutter side walls 32 are also angular and are also sharpened to provide beveled cutting edges 47 (Figs. 1 and 2) which merge into the cutting edges 46. The cutting edges 47 cooperate with the edges 46 in opening the receptacle wall and function to vertically cut the sides of the opening and to turn in a cut-out portion 48 of the receptacle wall as shown in Fig. 3. This forms a U-shaped opening 52 (Fig. 3) in the side of the receptacle corresponding generally to the cross section of the cutter. It is through this opening that the liquid contents immediately flow, passing by way of the cutter pocket 25 and through its opening into the bottom of the dispenser A.

Sliding movement of the cutter B along its guideways is easily effected by means of a handle member 55 (Figs. 1, 3 and 4) which is centrally disposed within the pocket 25 and is loosely connected with the cutter. This handle carries a pin 56 held in bosses 57 formed on both sides of the handle, the ends of the pin extending beyond the bosses and having sliding movement within vertical slots 58 cut in the side walls 26 of the cutter.

The lower end of the handle is pivoted on a pin 61 held in fixed blocks 62 secured to the inclined housing wall 29 by screws 63. The upper free end of the handle extends out of the pocket 25 to a position above the top of an inserted receptacle within the dispenser. It is thus very accessible and easily operable, only one single movement (from the position of Fig. 1 into that of Fig. 3) being necessary to force the cutter into the receptacle wall. When not in use it is outside of the dispenser body proper, leaving the dispenser free and clear for the easy insertion and removal of the receptacle.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A liquid dispensing device comprising in combination, a dispenser adapted to receive and support a sealed receptacle containing a liquid to be dispensed and also adapted to receive and retain the liquid from said receptacle, and a cutter mounted on said dispenser and movable relative thereto for cutting an opening in the side wall of said sealed receptacle to permit said liquid to flow by gravity into the dispenser.

2. A liquid dispensing device comprising in combination, a dispenser adapted to receive and support a sealed receptacle containing a liquid to be dispensed and also adapted to receive and retain the liquid from said receptacle, means for supporting said receptacle in said dispenser, and a cutter movably mounted on said dispenser and normally out of engagement with a sealed receptacle supported therein, said cutter being movable towards said receptacle for cutting an opening in the side wall of the same when held on said supporting means, to permit said liquid to flow by gravity into the dispenser.

3. A liquid dispensing device comprising in combination, a dispenser adapted to receive a sealed receptacle containing a liquid to be dispensed and also adapted to receive and retain the liquid from said receptacle, means for supporting said receptacle in said dispenser, and a cutter slidably mounted in said dispenser adjacent a side wall of said receptacle for cutting an opening in said receptacle side wall adjacent its bottom wall when the receptacle is held by said supporting means for draining its liquid contents into said dispenser.

4. A liquid dispensing device comprising in combination, a dispenser adapted to receive a sealed receptacle containing a liquid to be dispensed and also adapted to receive and retain the liquid from said receptacle, means for supporting said receptacle in said dispenser, a cutter slidably mounted in said dispenser for cutting an opening in the side wall of said sealed receptacle when held by said supporting means to permit said liquid to flow into said dispenser, and means operable from outside said dispenser for actuating said cutter.

5. A liquid dispensing device comprising in combination, a dispenser adapted to receive a sealed receptacle containing a liquid to be dispensed and also adapted to receive and retain the liquid from said receptacle, means for supporting said receptacle in said dispenser, a housing associated with said dispenser and communicating with its interior, guideways disposed within said housing, and a cutter slidably mounted in said guide ways and contained within said housing for cutting an opening in said receptacle side wall at a low point near its bottom while it is held by said supporting means for draining said liquid into said receptacle.

6. A liquid dispensing device comprising in combination, a dispenser adapted to receive a sealed receptacle containing a liquid to be dispensed and also adapted to receive and retain the liquid from said receptacle, a housing associated with said dispenser and communicating with its interior, guideways disposed within said housing, a cutter slidably mounted in said guideways and located in said housing for cutting an opening in said receptacle side wall at a low point near its bottom for draining said liquid into said receptacle, and a pouring spout associated with the dispenser for dispensing said liquid.

ELMER L. NALL.